United States Patent Office 3,657,408
Patented Apr. 18, 1972

3,657,408
PROCESS FOR SHAPING ACRYLONITRILE POLYMERS
Suresh N. Chinai, Greenwich, Conn., and Edmund Brigmanis, Pensacola, Fla., assignors to American Cyanamid Company, Stamford, Conn.
No Drawing. Filed Apr. 24, 1970, Ser. No. 31,753
Int. Cl. D01f 7/00
U.S. Cl. 264—182
8 Claims

ABSTRACT OF THE DISCLOSURE

Shaped substantially non-porous polymers containing at least about 70 percent by weight acrylonitrile and having a novel crenulated surface having improved resistance to soiling are provided. Such products are prepared by dissolving the polymer in aqueous sodium thiocyanate, extruding or otherwise shaping the solution and thereafter coagulating the shaped product with an aqueous solution containing aluminum chloride, magnesium chloride or calcium chloride or by dissolving the polymer in an organic solvent therefor, shaping and thereafter coagulating the shaped product in an aqueous solution containing aluminum chloride or magnesium chloride.

---

This invention relates generally to acrylonitrile polymers and more particularly to novel shaped products such as, for example, filaments, rods, tubes, films, ribbons, sheets and fibers of acrylonitrile polymers and to a method for making them.

Methods for making shaped products of polyacrylonitrile and interpolymers of acrylonitrile and other monomers polymerizable therewith have been proposed heretofore. For example, Cresswell in U.S. 2,558,730 discloses one method for making fibers and the like from acrylonitrile polymers wherein the polymer is dissolved in a suitable aqueous solvent therefor, extruded and coagulated in water at a temperature of not more than +10° C. Stanton in U.S. 2,790,700 and Crozier in U.S. 3,346,685 disclose that the low temperatures of Cresswell can be avoided by substituting a concentrated aqueous zinc chloride solution for water as the coagulating medium. However, coagulation is very slow and the shaped product, like that of Cresswell and of similar heretofore disclosed processes, has a round, oval or dog-bone cross-section. Textile fibers made from acrylonitrile polymers and having such a cross-section have a relatively poor luster and are relatively easily soiled. A process for coagulating a dimethylformamide solution of acrylonitrile in aqueous calcium chloride is disclosed in U.S. 2,451,420 but the temperature of the coagulating bath must be so high that it is very difficult if not impossible to maintain proper salt concentration because of evaporation of water. A similar process is disclosed in U.S. 2,728,631 but the process requires refrigeration of the coagulating bath and the gel obtained in the bath is relatively low in polymer content.

It is therefore an object of this invention to provide a shaped acrylonitrile polymer having improved anti-soiling characteristics. Another object of the invention is to provide a process for making a shaped substantially non-porous acrylonitrile polymer having improved resistance to soiling. A further object of the invention is to provide a process for coagulating a solution of an acrylonitrile homopolymer or interpolymer to produce a gel having a greater polymer solids content than that coagulated by prior art processes. A more specific object of the invention is to provide a method for spinning a solution of acrylonitrile polymer into a novel aqueous coagulating bath.

The objects of this invention are accomplished, generally speaking, by providing a shaped acrylonitrile polymer having a crenulated cross-section and a process for making it. It has been found that a shaped substantially non-porous acrylonitrile polymer having a crenulated cross-section and improved anti-soiling characteristics can be prepared by a process wherein a shaped solution of the polymer is coagulated in an aqueous solution containing at least about 75 percent of that amount of aluminum chloride, calcium chloride or magnesium chloride required to prepare a saturated aqueous solution thereof. In one embodiment of the invention, a solution of an acrylonitrile homopolymer or of an interpolymer of at least about 70 percent by weight acrylonitrile and a total of up to about 30 percent of one or more ethylenically unsaturated monomers polymerizable therewith in an aqueous solution of sodium thiocyanate or in an organic solvent therefor is shaped by extrusion or similar process and coagulated in an aqueous solution containing at least about 75 percent of that amount of aluminum chloride required to prepare a saturated aqueous solution thereof. In another embodiment of the invention, a shaped solution of an interpolymer of acrylonitrile containing from about 70 percent to about 95 percent by weight acrylonitrile and dissolved in sodium thiocyanate is coagulated by contacting it with an aqueous solution containing at least 75 percent of that amount of magnesium chloride or calcium chloride required to prepare a concentrated aqueous solution thereof. In still another embodiment of the process of the invention which produces a shaped polymer having a crenulated cross-section, a solution of an interpolymer containing from about 70 percent to about 95 percent by weight of acrylonitrile and dissolved in an organic solvent therefor is coagulated in an aqueous solution containing at least about 75 percent of that amount of magnesium chloride required to prepare a saturated aqueous solution thereof. Best results have been obtained so far with aqueous sodium thiocyanate solutions of an acrylonitrile homopolymer or interpolymer so an aqueous solution is preferred over an organic solvent solution of the polymer.

Aluminum chloride is preferred as the solute in the coagulant because an aqua-gel is obtained containing at least about 40 percent by weight polymer from either a solution of homopolymer or interpolymer of acrylonitrile in an aqueous solution of sodium thiocyanate. A gel having a polymer solids content of at least about 40 percent by weight is also obtained when an aqueous sodium thiocyanate solution of an interpolymer containing from about 70 percent to about 95 percent by weight acrylonitrile is coagulated in an aqueous solution containing at least 75 percent of saturation of magnesium chloride or calcium chloride but a higher solids content can be obtained with magnesium chloride than with calcium chloride. The preferred concentration of aluminum chloride, magnesium chloride or calcium chloride in the coagulant is from about 80 percent to about 90 percent of saturation.

Any suitable organic solvent for acrylonitrile homopolymer or interpolymers containing at least about 70 percent by weight acrylonitrile may be used to prepare the solution to be coagulated including, for example, those solvents disclosed in U.S. 3,101,245 and in the patents referred to therein. Dimethylformamide is a preferred organic solvent because the gel obtained by coagulating a solution of acrylonitrile polymer in accordance with this invention has a solids content of at least about 40 percent by weight. Other solvents such as dimethylacetamide and dimethylsulfoxide can be used but the solids content of the gel obtained when a solution of acrylonitrile polymer therein is coagulated may be less than 40 percent.

A saturated aqueous solution of aluminum chloride contains at 25° C. about 31 percent by weight thereof. An aqueous solution of about 36 percent magnesium chloride and an aqueous solution of about 46 percent calcium chloride are saturated solutions at 25° C.

The apparatus and process steps disclosed by Cresswell in U.S. 2,558,730 and by Fujita et al. in U.S. 3,101,245 may be used in practicing this invention provided that the coagulant disclosed herein is substituted for those used by the patentees. The coagulant may be used at any suitable temperature but room temperature is the most convenient. Evaporation becomes a problem over 70° C. so the preferred temperature range is from about 20° C. to about 70° C. In practicing the invention an acrylonitrile homopolymer or interpolymer of acrylonitrile is first prepared by any of the prior art methods such as the one disclosed in U.S. 2,160,054. In preparing a copolymer up to about 30 percent by weight of a monomer polymerizable with acrylonitrile is mixed with the acrylonitrile. Any of the known copolymerizable ethylenically unsaturated monomers may be used including, for example, vinyl esters such as vinyl acetate, vinyl propionate and the like. acrylic and alkacrylic acids such as methacrylic acid, esters and amides of acrylic and alkacrylic acids such as methacrylates and similar monomers disclosed in U.S. 3,104,938 and 3,040,008. The homopolymer or interpolymer may have any suitable molecular weight but a molecular weight of from about 15,000 to about 300,000 is preferred.

The length of coagulation time required will vary depending upon the composition of the polymer, temperature of coagulant, spinning rate, thickness of filament, the particular chloride used and concentration thereof. However, in most instances, coagulation can be effected in from about 30 to about 60 seconds. The coagulating medium may be a bath through which the spun filament is drawn or it may be applied to the shaped solution by spraying, padding or any other suitable method.

After coagulation, the aqua-gel shaped products are washed free of solvent and salts with water. Filaments are preferably oriented by stretching after leaving the coagulant and while still in a water swollen state in accordance with prior art methods.

In the following examples all parts and percentages are by weight unless otherwise specified.

EXAMPLE I

About 11.2 parts of a copolymer of about 10.7 percent methyl methacrylate and about 89.3 percent acrylonitrile are dissolved in a solution of about 41 parts sodium thiocyanate and about 47.8 parts water. The resulting solution is extruded at a velocity of about 6.8 meters per minute through a spinnerette having 20 round orifices of about 90 microns diameter into an aqueous solution at room temperature (about 20° C.) and containing about 33 percent magnesium chloride. The linear speed of travel of the gel strand is such that the strand is exposed to the aqueous magnesium chloride solution for about 27 seconds before it is removed and washed with water. The gel strand contains about 53 percent copolymer based on the total weight of gel. The strand is stretched to about 1.3 times its unstretched length as it leaves the coagulating bath, washed with water at room temperature (20° C.), and stretched again while in water at 100° C. to about 4.8 times its length or to a total of about 6.2 times its original unstretched length. The resulting filament is dried and then steamed in a free to relax state at about 127° C. During drying and steaming, the filament shrinks a total of about 43.5 percent of its unstretched length. The finished fibers are about 2.7 denier having a tenacity of about 2.5 grams per denier and an elongation of about 47.5 percent. The fibers are visually semi-lustrous and silk-like in appearance with a high degree of glitter. A microscopic examination of a cross-sectional slice perpendicular to the fiber axis shows it to have a crenulated surface.

The apparent soiling characteristic of a fiber is conventionally determined experimentally by measuring the amount of light which the fiber reflects and transmits. When fibers are soiled, the amount of light reflected is less than that reflected by similar but unsoiled fibers. There is an increase in reflectance when the soil is removed. The soiling and cleaning potential of a fiber may be determined, therefore, by the amount of change in reflectance between an unsoiled sample, a dirty sample and a cleaned sample.

Transmitted light is also an indication of apparent soiling. Low amounts of transmitted light generally indicate a fiber will have reduced soiling. It has been the practice in the past to reduce the tendency to soil by incorporating a delusterant such as titanium dioxide in the fiber. Unfortunately, such a method reduces the reflected light to a very low level resulting in a chalky appearance and also contributes generally to poor esthetic values.

Light reflection values may be determined by the methods described by Meredith in "Physical Methods of Investigating Textiles," pages 338–343, published by Textile Book Publishers, Inc., copyright 1959. In accordance with that method a pad of fiber is wound with all turns parallel and close together. A light beam, e.g., a gas laser, is directed at a 45° angle to the surface of the pad. Light is reflected from the pad at a 45° angle to a photoconductive cell. The intensity of the light is recorded in comparison with that of a standard fiber accepted arbitrarily as 100 percent reflected light.

Light transmission values are measured with a Fisher electrophotometer having a 425 micron wavelength filter. The instrument is calibrated with the cuvettes filled with dimethylphthalate. 0.5 gram of fibers cut into lengths of less than ⅛ inch are dispersed in the measuring cuvette, and the meter is adjusted to the zero mark. The reference cuvette contains only dimethylphthalate so any loss of light transmission through the measuring cuvette is caused by the fibers.

The soiling charatceristics of the fibers produced by Example I, of rayon fibers and of acrylic fibers having a round cross-section of the type produced by the method disclosed in U.S. 2,558,730 are determined by measuring transmitted light and reflected light as just described. The fibers are then soiled by identical processes and the reflected light measured. The soiled samples are cleaned by identical methods and the reflected light again measured. The total soiling propensity is calculated as the difference in reflectance between the unsoiled sample and the sample after cleaning. The results of the comparative test are:

TABLE I

| Fiber | Unsoiled (1) | | Soiled (2) | | Cleaned (3) | | Soiling propensity #1-#3 |
|---|---|---|---|---|---|---|---|
| | Light trans. | Light refl. | Light refl. | #1-#2 | Light refl. | #3-#2 | |
| Round acrylic | 100 | 100 | 18 | 82 | 33 | 15 | 67 |
| Rayon | 50 | 140 | 28 | 112 | 38 | 10 | 102 |
| Example I | 25 | 69.5 | 48.5 | 21 | 55.5 | 7 | 14 |

Comparison of the transmitted light values indicates the fiber of this invention is less subject to soiling than either rayon or a round not crenulated acrylic fiber. The lower values obtained with the fiber of this invention when differences between reflectance of unsoiled, soiled and cleaned fibers are determined indicates it has improved soiling charatceristics. It is apparent from these data that the acrylic fiber having a crenulated surface has semi-bright luster, low transmittance and much improved soiling characteristics.

EXAMPLE II

Example I is repeated except that an aqueous solution containing about 29 percent aluminum chloride is substituted for the one containing magnesium chloride. The aqua-gel strand has a solids content of about 53 percent, and the dried fiber has a crenulated cross-section.

The apparent soiling properties are approximately the same as those of the fibers of Example I.

EXAMPLE III

Example I is repeated except an aqueous solution containing about 42 percent calcium chloride is substituted for the aqueous solution of magnesium chloride. The gel strand has a solids content of about 53 percent. The dried fiber has a crenulated cross-section. The apparent soiling properties of the fiber are about the same as those of the fiber of Example I.

EXAMPLE IV

A series of films each about 10 millimeters thick are cast from the polymer solution of Example I on glass plates which are then placed in coagulating baths containing the various percentages of magnesium chloride and having the temperatures indicated in Table II. After coagulation of the film, thereon, the glass plates are removed from the bath and washed with water at about 20° C. Excess water is removed by blotting, the film is weighed, dried and weighed again to determine the polymer solids of the coagulated and washed but undried film. Films of similar composition coagulated in water are included for comparison.

TABLE II

| Coagulant | Temperature, °C. | Percent solids |
|---|---|---|
| Water | 25 | 16.4 |
| Do | 0 | 20.4 |
| MgCl₂, percent: | | |
| 15 | 25 | 19 |
| 15 | 2 | 22 |
| 25 | 25 | 25 |
| 25 | 2 | 28 |
| 27 | 25 | 40 |
| 29 | 25 | 61 |
| 31 | 25 | 63 |
| 33 | 2 | 60 |
| 33 | 25 | 66 |
| 33 | 40 | 60 |
| 33 | 70 | 64 |

A concentation of about 27 percent by weight magnesium chloride in the aqueous coagulating solution is about 76 percent of saturation. The data in Table II substantiate that a concentration of about 75 percent of saturation is required to produce a coagulated but undried gel product having a solids content of at least about 40 percent when the chloride in the coagulating medium is magnesium chloride. The data also demonstrate that the temperature of the coagulating medium can vary over a wide range.

EXAMPLE V

Example I is repeated except a solution containing about 11.2 parts of an acrylonitrile homopolymer dissolved in about 41 parts sodium thiocyanate and about 47.8 parts water is extruded into an aqueous solution at about 20° C. containing about 28 percent aluminum chloride. The gel strand before drying contains about 40 percent polymer solids. The dried fiber has a crenulated surface and approximately the same properties as shown for the fiber of Example I in Table I.

EXAMPLE VI

A cast film is prepared by the process of Example IV from the solution of homopolymer of Example V and coagulated at about 20° C. in an aqueous solution containing about 28 percent aluminum chloride. The washed out undried film contains about 40 percent polymer solids and the dried film has a wrinkled surface.

EXAMPLE VII

A film is prepared in accordance with the process of Example IV except that the coagulating solution is at about 20° C. and contains about 42 percent calcium chloride. The washed but undried film contains about 53 percent copolymer solids. The dried film has a wrinkled surface.

EXAMPLE VIII

A film is prepared in accordance with the process of Example IV except that the coagulating medium is an aqueous solution containing about 29 percent aluminum chloride at about 20° C. The coagulated film before drying contains about 65 percent solids. The film after drying has a wrinkled surface.

EXAMPLE IX

A solution containing about 11.2 parts of a copolymer of about 5.8 percent methylmethacrylate and about 94.2 percent of acrylonitrile dissolved in about 47.8 parts water containing about 41 parts sodium thiocyanate is cast into a film and coagulated at about 20° C. as described in Example IV in an aqueous medium containing about 33 percent magnesium chloride. The coagulated film after washing but before drying has a solids content of about 48 percent. The surface of the dried film is wrinkled.

EXAMPLE X

Example IX is repeated except the polymer composition is about 10 percent methylacrylate and about 90 percent acrylonitrile. The coagulated film after washing but before drying contains about 55 percent polymer solids. The dried film has a wrinkled surface.

EXAMPLE XI

Example IX is repeated except the polymer composition is about 7.2 percent methylacrylate and about 92.8 percent acrylonitrile. The coagulated film after washing but before drying has a polymer solids content of about 45 percent. The dried film has a wrinkled surface.

EXAMPLE XII

About 11.2 parts homopolymeric acrylonitrile are dissolved in about 88.8 parts of an aqueous solution containing about 46 percent sodium thiocyanate. The resulting solution is used to cast a series of films on glass plates. The cast films are coagulated in an aqueous solution of aluminum chloride of the concentration shown in Table III. The percentage solids of each film after washing in water but before drying is shown in Table III.

TABLE III

| Concentration of aluminum chloride: | Percent solids of gel |
|---|---|
| 11 | 19 |
| 16 | 21 |
| 20 | 24 |
| 24 | 30 |
| 29 | 51 |

The only gel having the preferred solids content of at least above 40 percent was coagulated in a 29 percent solution of aluminum chloride which is about 90 percent of saturation.

EXAMPLE XIII

Example I is repeated except that the solvent for the copolymer is dimethylformamide. The gel strand contains about 52.4 percent copolymer solids and after stretching, washing and drying has a crenulated cross-section and improved antisoiling characteristics.

EXAMPLE XIV

A film is cast by the process of Example IV using a 11.2 percent solution of a copolymer containing about 95 percent acrylonitrile and about 5 percent methylmethacrylate in dimethylformamide and an aqueous solution containing about 33 percent magnesium chloride as the coagulant. The aqua-gel film contains about 53 percent copolymer solids and, after drying, the film has a wrinkled surface and has improved antisoiling characteristics.

EXAMPLE XV

A film is cast by the process of Example IV using a 11.2 percent solution of a copolymer containing about 10.7 percent methyl methacrylate and about 89.3 percent acrylonitrile dissolved in dimethylacetamide. An aqueous solution containing about 33 percent magnesium chloride is used as the coagulant. The gel contains about 31 percent copolymer solids, the dried film has a wrinkled surface and improved anti-soiling characteristics.

EXAMPLE XVI

Example XV is repeated except that dimethylsulfoxide is substituted for dimethylacetamide. The gel contains about 24 percent solids and the dried film has a wrinkled surface and improved anti-soiling characteristics.

EXAMPLE XVII

Example XV is repeated except dimethylacetamide is used instead of dimethylformamide and a 33 percent aqueous solution of aluminum chloride is substituted for the magnesium chloride coagulant. The resulting aqua-gel film contains about 19 percent copolymer solids and, after drying, the film has a wrinkled surface and improved anti-soiling characteristics.

EXAMPLE XVIII

Example XVII is repeated except dimethylsulfoxide instead of dimethylacetamide is used as the solvent for the copolymer. The aqua-gel film contains about 20 percent copolymer solids and, after drying, the film has a wrinkled surface and improved anti-soiling characteristics.

The product of this invention has a crenulated cross-sectional shape, a light transmission of less than about 30, light reflection greater than about 65 and can be used to advantage in making yarns, fabrics, carpets, draperies and the like.

The solution of acrylonitrile polymer in sodium thiocyanate may contain any of the other conventional components ordinarily included in shaped articles of acrylonitrile homopolymers or copolymers such as flame retardants, viscosity depressants, soil retardants, delustrants and the like. In its broadest aspects, the invention contemplates coagulating baths containing any one of aluminum chloride, magnesium chloride or calcium chloride or mixtures thereof in concentrations which produce a product having the improved characteristics.

The term "crenulated" is used herein to describe the shape of a fiber taken in a plane through the fiber perpendicular to its length. By "crenulated" is meant a plurality of irregularly shaped lobes extending generally outwardly from the fiber center and constituting the circumference thereof, resembling generally the cross-section of a fiber of viscose rayon. It has been noted that generally one or more pairs of adjacent lobes have closed at their extremities creating a void in the fiber extending parallel with the longitudinal axis of the fiber. It is believed these voids in combination with unclosed lobes might be at least partially responsible for the silk-like luster and anti-soiling properties of the fiber.

Although the invention has been described in detail for the purpose of illustration, it is to be understood that such detail is solely for that purpose and that variations can be made therein by those skilled in the art without departing from the spirit and scope of the invention except as it may be limited by the claims.

We claim:
1. In a process for forming shaped articles of acrylonitrile polymer containing at least about 70 percent by weight of acrylonitrile and a total of up to about 30 percent by weight of one or more ethylenically unsaturated monomers polymerizable therewith from a solution of said polymer in aqueous sodium thiocyanate or organic solvent, the improvement comprising coagulating said solution in an aqueous coagulant containing dissolved therein in at least about 75 percent of the amount of aluminum chloride required to make a saturated solution thereof, and thereafter drying the resulting gel.

2. A process as defined in claim 1 wherein the concentration of aluminum chloride in said aqueous coagulant is sufficiently high that said resulting gel contains at least about 40 percent by weight of said polymer prior to drying.

3. In a process for forming shaped articles of acrylonitrile polymer containing about 70 to about 95 percent by weight of acrylonitrile and a total of about 5 to 30 percent by weight of one or more ethylenically unsaturated monomers polymerizable therewith from a solution of said polymer in aqueous sodium thiocyanate solvent, the improvement comprising coagulating said solution in an aqueous coagulant containing dissolved therein at least about 75 percent of the amount of aluminum chloride, magnesium chloride, or calcium chloride required to make a saturated solution thereof and thereafter drying the resulting gel.

4. The process of claim 3 wherein said chloride is aluminum chloride.

5. The process of claim 3 wherein said chloride is magnesium chloride.

6. A process as defined in claim 3 wherein the concentration of aluminum chloride, magnesium chloride, or calcium chloride in said aqueous coagulant is sufficiently high that said resulting gel contains at least about 40 percent by weight of said polymer prior to drying.

7. In a process for forming shaped articles of acrylonitrile polymer containing about 70 to about 95 percent by weight of acrylonitrile and a total of about 5 to 30 percent by weight of one or more ethylenically unsaturated monomers polymerizable therewith from a solution of said polymer in an organic solvent therefor, the improvement comprising coagulating said solution in an aqueous coagulant containing dissolved therein at least about 75 percent of the amount of magnesium chloride reuqired to make a saturated solution thereof, and thereafter drying the resulting gel.

8. A process as defined in claim 7 wherein the concentration of magnesium chloride in said aqueous coagulant is sufficiently high that said resulting gel contains at least about 40 percent by weight of said polymer prior to drying.

References Cited
UNITED STATES PATENTS

| | | | |
|---|---|---|---|
| 2,426,719 | 9/1947 | Watkins | 264—182 |
| 2,648,646 | 8/1953 | Stanton et al. | 260—29.6 |
| 2,728,631 | 12/1955 | Drisch et al. | 264—182 |
| 2,790,700 | 4/1957 | Stanton et al. | 264—9 |
| 2,972,511 | 2/1961 | Bechtold | 264—9 |
| 2,984,912 | 5/1961 | Robertson | 34—23 |
| 3,368,015 | 2/1968 | Irion et al. | 264—182 |

JAY H. WOO, Primary Examiner

U.S. Cl. X.R.

260—29.6 AN